United States Patent [19]

Krucoff

[11] Patent Number: 5,693,987

[45] Date of Patent: Dec. 2, 1997

[54] VEHICLE KEYLESS DEADBOLT LOCKING SYSTEM

[76] Inventor: Darwin Krucoff, 2820 Alta View Dr., Unit B, San Diego, Calif. 92139

[21] Appl. No.: 688,262

[22] Filed: Jul. 29, 1996

[51] Int. Cl.⁶ ................................................. B60R 25/00
[52] U.S. Cl. ........................... 307/10.2; 70/264; 180/287
[58] Field of Search ............................. 307/10.1–10.6; 70/264, 237, 240, 241, 256, 257, 275, 277, 278, 280–282; 340/425.5, 426, 825.3–825.32, 825.34, 825.69, 825.72; 180/287, 289; 296/202

[56] References Cited

U.S. PATENT DOCUMENTS

| | | | |
|---|---|---|---|
| 3,756,341 | 9/1973 | Tonkowich et al. | 307/10.2 |
| 4,615,558 | 10/1986 | Nakamura et al. | 296/202 |
| 4,834,207 | 5/1989 | Havenhill et al. | 180/287 |
| 4,966,019 | 10/1990 | Hoffman et al. | 70/257 |
| 5,386,713 | 2/1995 | Wilson | 70/257 |
| 5,441,317 | 8/1995 | Gruden et al. | 70/264 |
| 5,525,977 | 6/1996 | Suman | 340/825.3 |
| 5,531,086 | 7/1996 | Bryant | 70/280 |
| 5,534,846 | 7/1996 | Kuroda | 180/287 |

*Primary Examiner*—Richard T. Elms

[57] ABSTRACT

A vehicle entry control system utilizing electrically operated deadbolts, actuated in response to the code signal of a remote control transmitter, which provide positive protection against the various mechanical techniques used to defeat conventional vehicle door locks. The system uses electrical linear actuators to position the deadbolts, a door interlocked switching circuit, with the deadbolts positioned to allow the mechanical release of the deadbolts in the event of a malfunction, but to accomplish this requires the facilities of a service shop and an amount of time and labor that would be prohibitive for a thief.

13 Claims, 2 Drawing Sheets

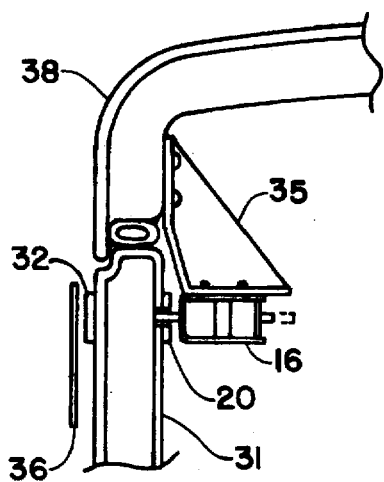
FIGURE 6
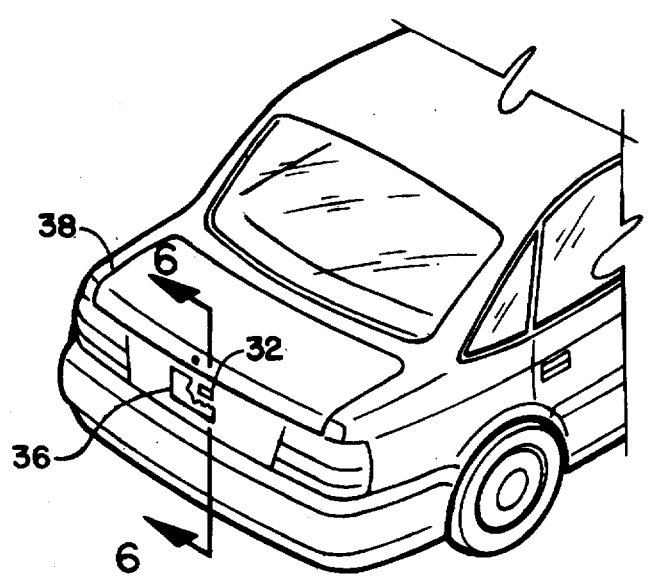
FIGURE 7
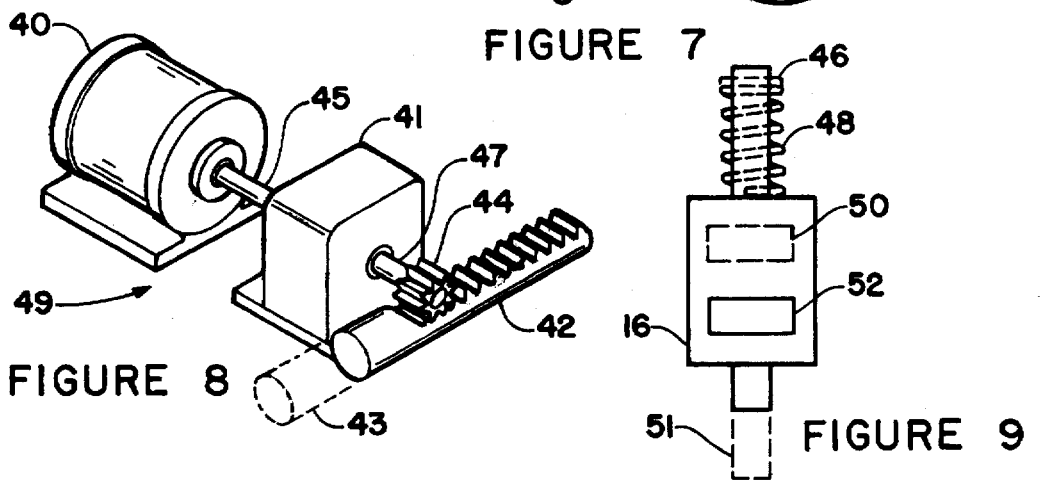
FIGURE 8
FIGURE 9
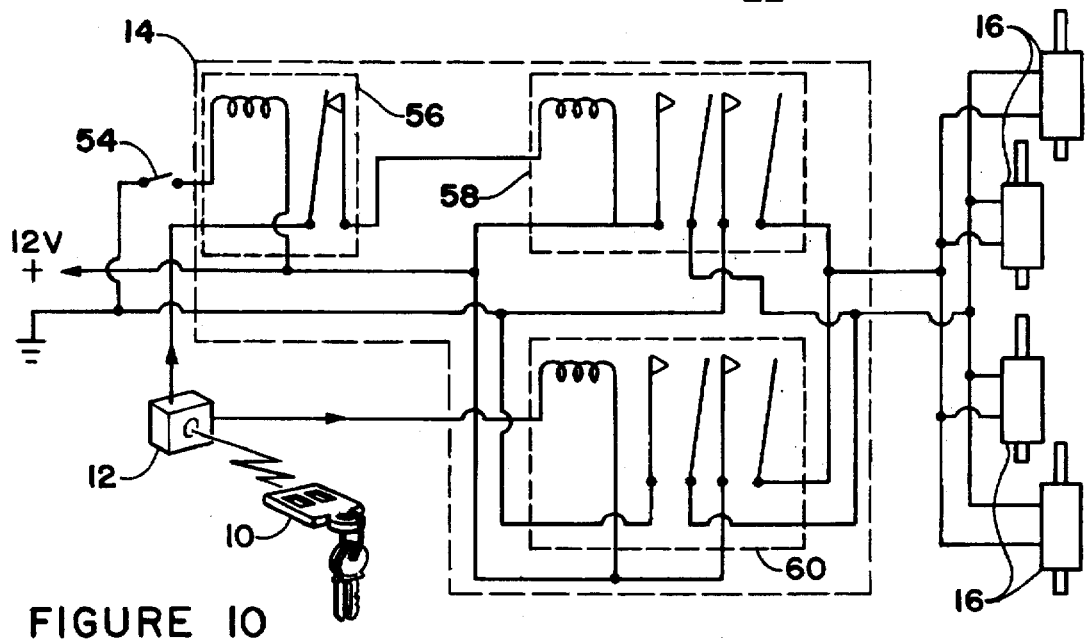
FIGURE 10

VEHICLE KEYLESS DEADBOLT LOCKING SYSTEM

BACKGROUND OF THE INVENTION

The invention is in the field of providing anti-theft protection for both a vehicle and its contents by means of secure entry control. The many vehicle theft deterrence systems presently available include alarms, ignition and other system disablers, mechanical steering wheel locks, and radio homing locator systems, but none of these provide entry control. Entry control still relies upon mechanical locks and keys that only dissable the door handles and are easily defeated. A thief can use a tool as simple as a screw driver to manipulate the door locks, or a bent wire to reach under the glass and reset the control button for the door handles, and entry is gained. This makes both the vehicle and its contents readily available to an intruder. As an example of how have this is recognized, most vehicle audio systems now have detachable faces that the owner can remove to discourage theft. It has been reported that there has also been widespread theft of airbag units, and cellular phones which, as with other contents, require only vehicle entry to accomplish. Regarding the vehicle itself, it cannot be driven away by a thief if it cannot be tentered. Published figures indicate that every 22 seconds a motor vehicle is stolen in the U.S. at a cost of $7 billlon a year.

Deadbolts have long been recognized as a means of securely locking a door, but cannot be employed in the conventional manner in a vehicle. For vehicle application, a deadbolt system requires electrical actuation from a remotely controlled digital code, and unique positioning and mounting in a structure that permits mechanical release, but only by means prohibitive for a thief.

SUMMARY OF THE INVENTION

The instant invention uses a small remote transmitter to provide the digital code signals for the lock and unlock functions, with the signals sensed by a receiver in the vehicle, in like manner to the way actuating signals are generated by conventional remote keyless locking or alarm systems. For vehicles that have such systems, the instant invention can use their signals to provide deadbolt actuation simultaneously with door handle disabling and alarm arming. In the instant invention the lock and unlock signals are inputs to a pair of relays that provide the power as well as the proper polarity to drive the linear actuators into the lock and unlock positions. Another relay senses door position and allows lock actuation of the deadbolts only when all doors are closed.

Any of a variety of linear actuators may be used. These include linear solenoids with permanent magnet latching in both directions, or in one direction with a spring return. Permanent magnet latching eliminates power drain from the vehicle's battery except during switching from one deadbolt position to the other. Motor driven linear actuators, such as provided by a rack and pinion mechanism, may also be used. In the lock position the deadbolts are extended into strike plates, which prevents door opening.

System failure with the deadbolts in the lock position can be remedied in a service shop by their mechanical release. In order to accomplish this without damage to the vehicle and with an appropriate amount of time and effort, they are mounted so that the extended lock position is downward, or in the case of the rear doors, it may be into the wheel well. This permits access to the deadbolts from below or by wheel removal, and they can then be manually returned to the unlocked position. However, this requires that the deadbolt position be located from below and a hole drilled at this location, followed by the insertion of a tool to press the deadbolt back to the unlock position. This can readily be accomplished in a service shop with the vehicle on a lift, but would be difficult and time consuming for a thief. If desired, the time and labor required to access the deadbolts can be increased by installing a security plate below the deadbolt position. Other barriers can be used in addition to or in place of the security plate. One of these would be an extension of the opening in the strike plate to form a well, the bottom of which must be removed for deadbolt access. In all cases the objective would be to allow repair in a service shop in about an hour or less, but clearly prohibitive for a thief under poor working conditions and pressed for time.

In addition to vehicle entry, deadbolts can also be used to secure the trunk and hood. For trunk lids that extend to the dumper area, the deadbolts can be mounted vertically as for the vehicle doors. For shorter lids, the deadbolts can be mounted horizontally with access from behind the license plate. For the hood, the deadbolts are mounted horizontally with access from behind a decorative escutcheon.

BRIEF DESCRIPTION OF THE DRAWINGS

FIG. 6 is a schematic view along the plane 6—6 of FIG. 7 showing a bidirectional latching solenoid mounted horizontally to secure the trunk lid of a vehicle having a short lid.

FIG. 7 is a pictorial rear view of a vehicle having a short trunk lid.

FIG. 8 is an isometric illustration of a motor driven rack and pinion type of linear actuator including a coupling means that reduces the force required to reset the deadbolt to the unlock position.

FIG. 9 is a combined view of a linear solenoid with permanent magnet latching in both directions, and with permanent magnet latching in one direction and a spring return.

FIG. 10 is a schematic diagram of the circuit showing the remote control transmitter and receiver, the lock, unlock and door interlock relays, the door switch and solenoid linear actuators.

DESCRIPTION OF THE ILLUSTRATED EMBODIMENTS

Figure 1:
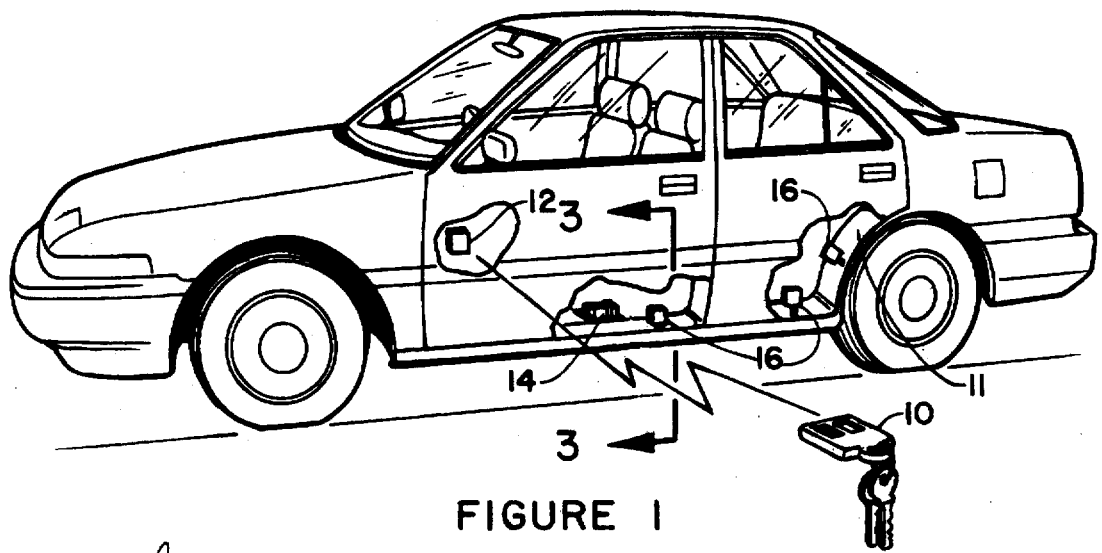
FIG. 1 is a pictorial view of a vehicle showing the digital code producing transmitter and receiver, the control relays, and the mounting positions of the front and rear door solenoids/deadbolts.

As shown in FIG. 1, a small remote control transmitter 10, typically attached to a key ring as shown, is used to generate a digital electrical code. The code is sensed by a receiver 12 in the vehicle in the same manner as actuating signals are generated by conventional remote keyless locking or alarm systems. In conventional remote keyless locking systems, the code signals are only used to disable the outside door handles, and there is no protection against manipulation of the mechanical lock or the inside control button. Alarm systems use the code signals to arm the system, but do not provide entry control. In the instant invention the code signals are used as inputs to the relay unit 14 that drives linear actuators 16 to provide deadbolt locking and unlocking. With the deadbolts in the lock position, mechanical manipulation of the lock or control button will not gain entry for an intruder.

In addition to providing secure locking, the use of electrically operated deadbolts in a vehicle requires that there be a means for mechanically releasing the deadbolts in the event of electrical system failure. Such means requires further that it be sufficiently difficult that it would not be feasible for an intruder, yet comparable to a minor repair in a service shop. These two objectives are accomplished, as shown in FIG. 1, by the unique placement of the linear actuators. Conventional deadbolts are mounted horizontally so they extend in the lock position into a door jamb. In a vehicle this would require major body work for their mechanical release and thus is impractical. In FIG. 1 the deadbolts are seen to be mounted vertically at the bottom of the doors. This allows access to them from below with minimum, and out of sight, disturbance of the vehicle's body, and readily accomplished on a lift in a service shop, and yet is difficult for a thief, with the difficulty increased as desired as will be further indicated below. As also seen in FIG. 1, the rear doors may have the deadbolts mounted as for the front doors, or so that access is gained through the wheel well panel 11 after wheel removal.

Figure 3:
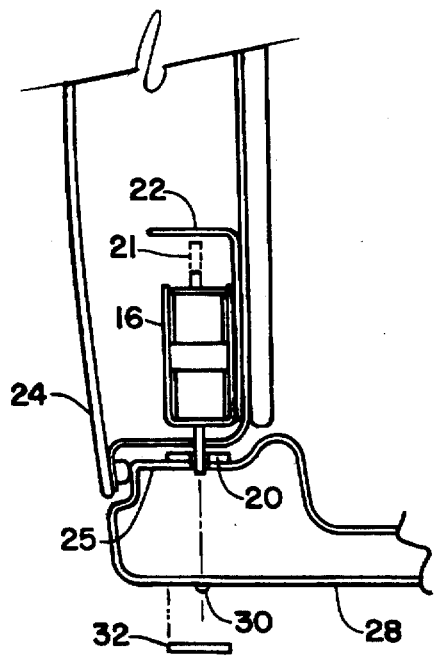
FIG. 3 is a schematic view along the plane 3—3 of FIG. 1 showing a bidirectional latching solenoid mounted in a vehicle with the plunger extended into the strike plate in the lock position, and showing the locating rivet and security plate.
Figure 2:
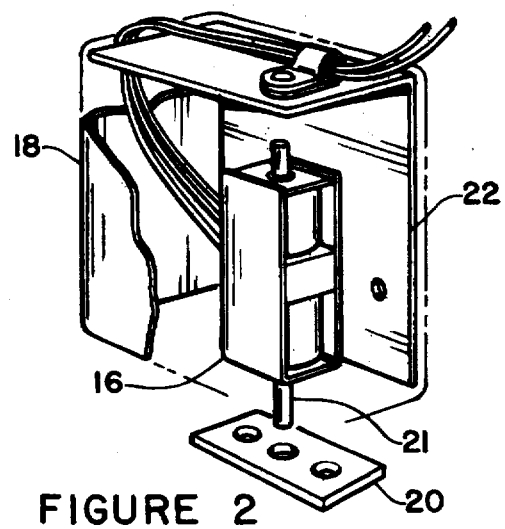
FIG. 2 is an enlarged view of a bidirectional latching type of solenoid using the plunger as a deadbolt, and showing the strike plate and protective cover.
Figure 4:
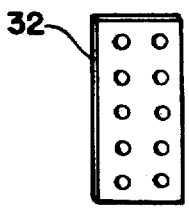
FIG. 4 is a plan view of a security plate showing the multiple rivets used to secure it over the locating rivet.
Figure 5A:
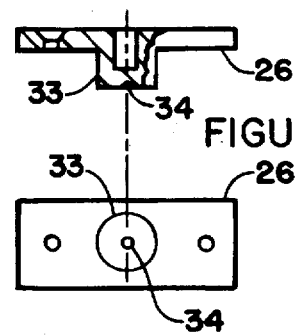
FIGS. 5A and 5B show side and plan views of a strike plate containing a well that receives the deadbolt and makes access to the deadbolt more difficult.
Figure 5B:
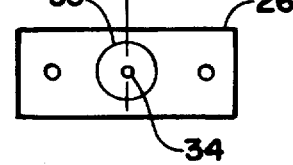

FIG. 2 shows an enlarged view of bidirectional latching solenoid 16 attached to a mounting plate 22 with the plunger of the solenoid 21 acting as the deadbolt, which enters strike plate 20 in the lock position, and furnished with protective cover 18. FIG. 3 is a schematic view along the plane 3—3 of FIG. I showing a bidirectional latching solenoid 16 mounted in the bottom of a vehicle door 24 in the lock position with the plunger extended into strike plate 20 which is attached to the adjacent bottom panel of door opening 25. Also shown is locating rivet 30 which is installed in the bottom panel of vehicle body 28 and in line with the plunger to assist in locating it, but which must be removed to permit the insertion of a tool for pressing the deadbolt back to the unlock position. An optional security plate 32, and further shown in plan view in FIG. 4, can be added over locating rivet 30, with security plate 32 secured by multiple rivets, as shown in FIG. 4, to make deadbolt access more difficult and time consuming. FIGS. 5A and 5B show a further means for increasing the difficulty of deadbolt access by modifying the strike plate. The modified strike plate 26, shown in side and plan views, includes a well 33 into which the deadbolt is extended in the lock position. Access to the deadbolt would require, in addition to the above operations, removal of the bottom of the well. This would be particularly difficult unless the vehicle was raised as on a lift in a service shop. Location of the center of the well is facilitated by the dimple 34.

Deadbolts may also be used to secure the trunk and hood of vehicles. For trunk lids that reach to the bumper area, deadbolts can be installed vertically as for doors. For shorter trunk lids, or for hoods, horizontal mounting can be used. FIG. 6 is a schematic view along the plane 6—6 of FIG. 7 showing solenoid 16 mounted horizontally by means of mounting bracket 35 on a short trunk lid 38. The solenoid plunger is shown extended in the lock position into strike plate 20 which is attached to the lower rear wall of trunk 31, and security plate 32 is attached to the body of the vehicle but out of sight behind license plate 36. For hoods a similar horizontal mounting arrangement can be used with the security plate hidden behind a decorative medallion. FIG. 7 is a pictorial rear view of a vehicle having a short trunk lid as further illustration of the mounting arrangement of FIG. 6.

A motor driven type of linear actuator is shown in FIG. 8. Motor 40 drives a pinion gear 44 that moves rack 42 linearly to act as a deadbolt, with its extended lock position shown as 43. To reduce the force necessary to restore the deadbolt to its unlock position, a coupling means 41 may be used that provides sufficient torque to gear 44 in the direction to drive deadbolt 42 to its lock position, but allows gear 44 to turn more freely in the opposite direction. Examples of such means are a ratchet mechanism and a slip clutch. Other types of motor driven linear actuators may be used such as those using a nut and lead screw to convert the rotary motion to a linear one.

FIG. 9 shows linear solenoid 16 in two versions. For permanent magnet latching in both directions, two permanent magnets 50 and 52 are used and spring 48 and retaining clip 46 are not. For permanent magnet latching in one direction, only a single permanent magnet 52 is required, with spring 48 and clip 46 used to return and maintain the deadbolt in the other position. The plunger/deadbolt lock position is shown at 51.

A schematic of the circuit using relays as the control elements is shown in FIG. 10. In relay unit 14, relay 58 applies the vehicle's 12 volt power supply to the solenoids 16, one in each of four doors, in the polarity required for extending the deadbolts into the lock position. Relay 60 applies the reverse polarity to the solenoids to reset the deadbolts to the unlock position. Relay 56 is an interlock relay that prevents the deadbolts from being extended to the lock position unless all doors are closed. Switch 54 represents the set of switches, one in each door and all wired in parallel, that vehicle manufacturers install to operate dome or courtesy lights when a door is opened. Relay 56 will likewise be operated when any door is open and will open the control circuit to lock relay 58. The control signals for the operation of relays 58 and 60 are obtained from receiver 12 in response to signals from transmitter 10. In place of the relays, solid state units can be used to provide the same functions. For motor driven linear actuators such as 49, the circuit would include limit switches for each actuator to establish the travel extent of the deadbolts.

The above has shown the necessary and sufficient conditions for the use of deadbolts in vehicles to obtain secure entry control. These are: 1. Electrical actuation of the deadbolts in response to a transmitted code signal; 2. Availability of various types of linear actuators to provide flexibility of system design; and 3. Unique and versatile means for the mechanical release of the deadbolts in the event of system electrical failure that can be accomplished in a service shop but would be prohibitive in time and labor for an intruder.

What is claimed is:

1. A vehicle keyless deadbolt locking system for vehicle doors, trunk and hood, said system comprising:
    (a) a portable digital code generating transmitter with a companion receiver having lock and unlock signal outputs mounted in the vehicle;

(b) a circuit responsive to the outputs of the said receiver that drive electrical linear actuators to place deadbolts into lock and unlock positions, said circuit interlocked with the vehicle doors to prevent placing the deadbolts into the lock position unless all doors are closed;

(c) deadbolts and companion strike plates mounted in the vehicle in positions that permit ready physical access in a service shop to said deadbolts to allow said deadbolts release from lock position to unlock position in the event of system electrical failure, but access would require a prohibitive amount of time and labor for a thief;

(d) means for adjusting the degree of difficulty of the actions required for deadbolt access; and (e) means for locating the deadbolt position to obtain deadbolt access by drilling through, or otherwise removing, one or more barriers at said deadbolt position.

2. A deadbolt locking system as recited in claim 1 wherein the barrier to deadbolt access is enhanced by means of a security plate placed over the deadbolt locating means and attached with numerous fasteners that must be removed for deadbolt access.

3. A deadbolt locking system as recited in claim 1 wherein the barrier to deadbolt access is further enhanced by using a strike plate that contains a well into which the deadbolt is inserted for locking, with access to the deadbolt obtained only after removal of the bottom of said well.

4. A deadbolt locking system as recited in claim 1 wherein said deadbolts are positioned at the bottoms of said vehicle doors to provide access to said deadbolts from beneath said vehicle.

5. A deadbolt locking system as recited in claim 1 wherein said deadbolts are positioned adjacent to said vehicle's rear wheel wells to provide access to said deadbolts from said rear wheel wells.

6. A deadbolt locking system as recited in claim 1 wherein longer trunk lids are secured by deadbolts mounted vertically to provide access to said deadbolts from beneath the vehicle, and shorter trunk lids and hoods are locked by deadbolts mounted horizontally with deadbolt location or the security plate covered by a rear license plate or a decorative medallion with access to said deadbolts obtained after removal of said barriers.

7. A deadbolt locking system as recited in claim 1 wherein the deadbolt position is identified by a locating rivet that must be removed for deadbolt access.

8. A deadbolt locking system as recited in claim 1 wherein the linear actuators are solenoids having plungers and said plungers are used as deadbolts.

9. A deadbolt locking system as recited in claim 1 wherein the linear actuators are motor driven rotary to linear mechanisms having linear members and said linear members are used as deadbolts.

10. A vehicle keyless deadbolt locking system for vehicle doors, trunk and hood comprising:

(a) a portable digital code generating transmitter;

(b) a companion receiver with lock and unlock signal outputs mounted in a vehicle having a plurality of doors, rear wheel wells, a trunk and a hood;

(c) at least one deadbolt for each of said doors connected to an electrical linear actuator mounted in said vehicle, said deadbolts located in the bottom of each door to permit ready physical access to said deadbolts in a service shop to allow said deadbolts release from lock to unlock position in the event of system electrical failure, but said release would require the removal of one or more barriers and thus a prohibitive amount of time and labor for a thief to accomplish;

(d) an electrical circuit in said vehicle responsive to said signal outputs of said receiver and said electrical circuit drives said linear actuators to move said deadbolts into locked and unlocked positions;

(e) said vehicle having door openings having a bottom panel, a strike plate secured to the bottom panel of each of the door openings of said vehicle that mates with the companion deadbolt in the locked position; and (f) said bottom panel having an outer surface and means on the outer surfaces of said bottom panels of the said vehicle at locations under each vehicle door for identifying where a barrier is to be removed to access the deadbolt of that door in order to effect the said release in the event of system electrical failure.

11. A deadbolt locking system as recited in claim 10 wherein the said deadbolts are positioned adjacent to the rear wheel wells to permit access from the said rear wheel wells.

12. A deadbolt locking system as recited in claim 10 wherein longer trunk lids are secured by deadbolts mounted vertically to provide access to said deadbolts from beneath the vehicle, and shorter trunk lids and hoods have horizontally mounted deadbolts with deadbolt location and barriers covered by a rear license plate or a decorative medallion with access to said deadbolts gained after the removal of said barriers.

13. A deadbolt locking system as recited in claim 10 wherein said electrical circuit includes a door interlock circuit that prevents placing the deadbolts into the lock position unless all doors are closed.

\* \* \* \* \*